United States Patent [11] 3,615,602

[72] Inventors Hans-Heinrich Credner
Munich;
Wolfgang Müller-Bardorff, Cologne, both of Germany
[21] Appl. No. 696,508
[22] Filed Jan. 9, 1968
[45] Patented Oct. 26, 1971
[73] Assignee AGFA-Gevaert Aktiengesellschaft
Leverkusen, Germany
[32] Priority Jan. 18, 1967
[33] Germany
[31] A54648

[54] COLOR-PHOTOGRAPHIC SILVER HALIDE EMULSION, CONTAINING COLORED CYAN-FORMING COUPLERS
7 Claims, No Drawings
[52] U.S. Cl. .................................................. 96/100, 96/9, 96/74
[51] Int. Cl. ..................................................... G03c 1/40
[50] Field of Search ........................................... 96/100

[56] References Cited
UNITED STATES PATENTS

| | | | |
|---|---|---|---|
| 2,808,329 | 10/1957 | Whitmore | 96/100 |
| 2,848,326 | 8/1958 | Whitmore | 96/100 |
| 2,860,974 | 11/1958 | Williams | 96/100 |
| 3,135,609 | 6/1964 | Klinger | 96/100 |
| 3,418,129 | 12/1968 | Kimura et al. | 96/100 |
| 3,459,552 | 8/1969 | Yoshida et al. | 96/100 |

*Primary Examiner*—J. Travis Brown
*Attorney*—Connolly and Hutz

ABSTRACT: This invention relates to a photographic silver halide emulsion providing improved cyan color reproduction. The emulsion contains colored cyan couplers for the production of integral masks, which couplers have an absorption maximum between 490 and 510 millimicrons. Color couplers which react upon photographic development with the oxidation product of aromatic amino developers to form colored images are well known. Generally these color-forming couplers are colorless or substantially colorless. This lack of color is desirable when the coupler is to be incorporated in the emulsion layer and the unused coupler remains in the layer after formation of the dye.

COLOR-PHOTOGRAPHIC SILVER HALIDE EMULSION, CONTAINING COLORED CYAN-FORMING COUPLERS

Couplers which are in themselves more or less strongly colored and which contain a chromophore group that is split off or destroyed during development with the result that the original color of the coupler is eliminated and a new dye is formed upon development, are also known. These colored color couplers generally have the chemical structure of conventional color couplers, except that a group, usually an azo dye group, is present at the coupling position. There is formed in this way a dye image consisting of the new dye and the residual colored coupler. The theory of color correction requires that the sum of the absorption of the residual color coupler and the undesired side absorption of the image dye should be approximately constant.

In order to correct for color deficiencies of the cyan image dye produced upon color-forming development, it is desirable to have colored couplers with a certain green and blue absorption. This requirement is not satisfactorily met by colored couplers of the prior art.

The desired exact absorption properties of the colored color coupler depend, of course, on the properties of the image dye formed upon development or in other words they depend on the structure of the basic color coupler. With color couplers which form azo-methine dyes particularly absorbent in the longwave range, and the corresponding azo dyes are colored red to magenta, the masking effect is not sufficient because the side absorption of the image dye in the blue region is much greater than in the green. On the other hand if a color coupler yields azo-methine dyes that absorb shorter wavelengths, the corresponding azo dyes absorb yellow to orange and the side absorption of the image dye is greater in the green region than in the blue, so that the masking effect is insufficient too. Since the magenta layer of a multilayer material contains a yellow azo dye, another yellow dye in the cyan layer would make the yellow density of the film material too high. Accordingly, a suitable masking dye for a cyan image should be red to magenta in color and should be prepared from a coupler which does not produce an excessively longwave absorbing azo-methine dye upon color-forming development.

If hydrophobic color couplers are used they should possess certain properties which facilitate their introduction into the photographic layer, such as a low melting point, high solubility in organic solvents such as ethyl acetate or methylene chloride, and high dispersibility. The components should not recrystallize in the gelatin layer and should form a fine dye grain.

It is among the objects of the present invention to provide colored color couplers for the production of integral masks which satisfy practical requirements with regard both to their photographic properties and to their absorption properties.

We now have found that colored cyan-forming couplers of the following formula are particularly suitable for the production of integral masks:

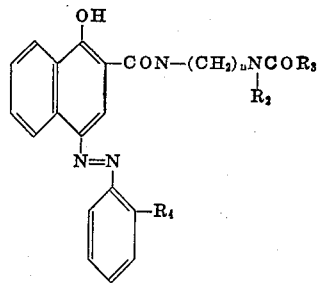

In this formula,
$R_1$ and $R_2 =$

1 Alkyl with preferably up to five carbon atoms such as methyl, ethyl, propyl or butyl which alkyl radicals may be substituted, for example, by hydroxyl, phenyl, halogen such as chlorine, or carboxyl; or 2 aryl radicals, in particular those of the phenyl series, which may also be substituted, for example by halogen atoms such as fluorine, chlorine or bromine, alkyl radicals in particular short-chain alkyl with up to three carbon atoms such as methyl or ethyl, substituted alkyl radicals, for example, halogen-substituted alkyl such as trifluoromethyl, carboxyl, esterified carboxyl, alkoxy preferably with up to five carbon atoms, aroxy such as phenoxy, or three hydrogen, $R_1$ and $R_2$ both may be hydrogen. For example, $R_1$ and $R_2$ may represent 4-chlorophenyl, 4-ethoxyphenyl, 4-methylphenyl, 2-methylphenyl, 2,4-dimethylphenyl, 3,5-dimethylphenyl, 3,5-dicarboxyphenyl, 4-carboxyphenyl,2-ethoxyphenyl and/or 3,5-ditrifluoromethylphenyl radicals.

$R_3 =$ 1 alkyl with up to 18 carbon atoms such as methyl, ethyl or stearyl, which alkyl radical may be substituted, for example, by hydroxy, halogen such as fluorine, chlorine or bromine, or sulfo, 2 alkenyl with up to 17 carbon atoms, (3) aryl, in particular a radical of the phenyl series, which aryl radical may in turn be substituted, for example, by an alkyl radical with up to 18 carbon atoms such as methyl or dodecyl, 4 an amino group in particular an alkyl or aryl-substituted amino group such as stearylamino, dodecylphenylamino or myristylamino, 5 alkoxy radical with up to 18 carbon atoms or 6 a phenoxy radical in which the phenyl group may be substituted, for example, with alkyl with up to 18 carbon atoms, halogen such as fluorine, chlorine or bromine or alkoxy having up to 18 carbon atoms, carboxy, esterified carboxy, or sulfo, etc.

$R_4 =$ carboxy, carbalkoxy with preferably up to five carbon atoms, acyl derived from aliphatic carboxylic acids with preferably up to 12 carbon atoms, sulfo or nitro and $n =$ 1 to 6.

Particular utility is exhibited by color couplers of the following formula:

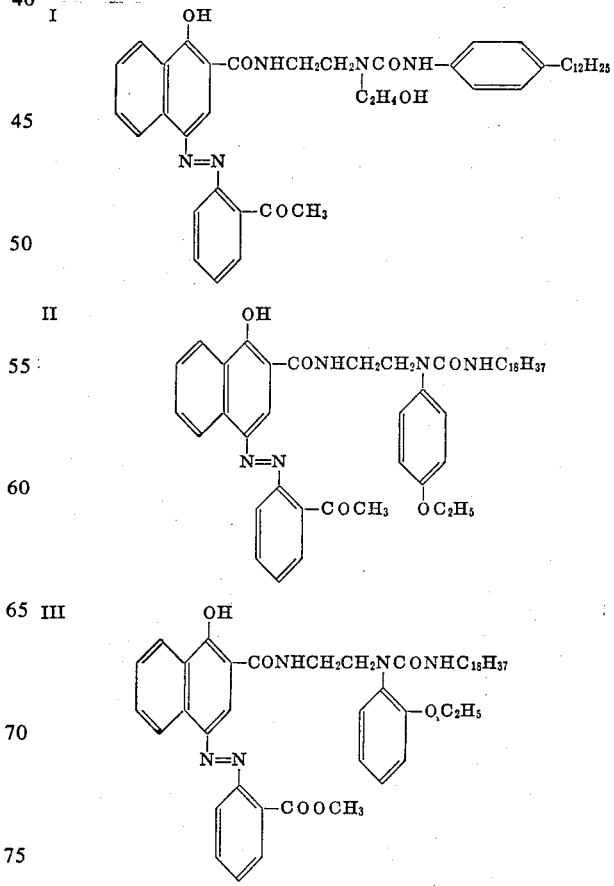

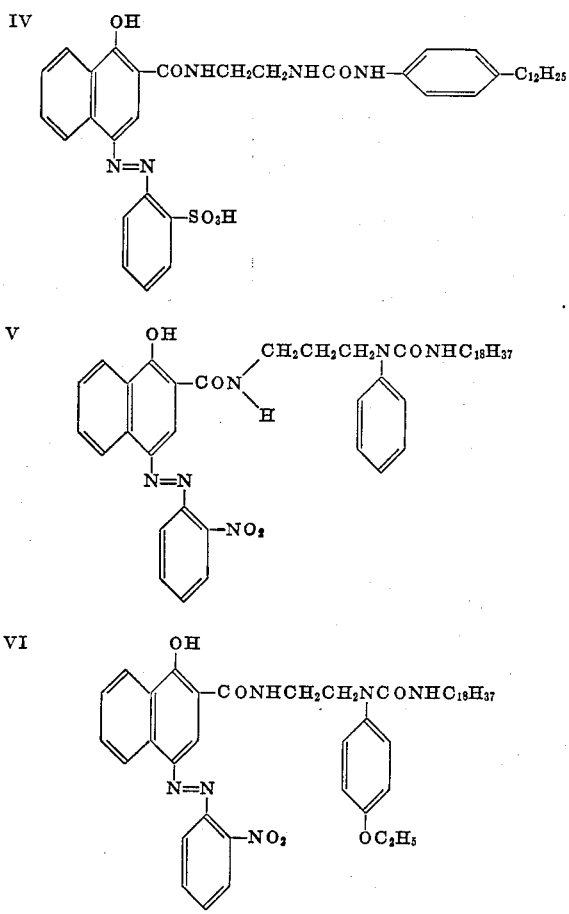

The azo dyes used according to the present invention are prepared as known per se by coupling diazotized amines with the corresponding cyan couplers. The following are some specific preparations.

Coupler I 10 g. of o-aminoacetophenone (0.074) are dissolved in 44 ml. of 5 N-hydrochloric acid and the resulting solution is quickly diazotized at −20° C. with 14.8 ml. of 5 N sodium nitrite solution (0.074 mol). The diazonium salt solution is then slowly added dropwise at 0° C. to a solution of 41.5 g. (0.074 mol) of the basic colorless color coupler (having the formula of compound I but with the phenylazo group replaced by hydrogen) in 200 ml. of pyridine. The product is then stirred for two hours and precipitated with ice/hydrochloric acid. The dye is suction-filtered, washed with water, dried and recrystallized from alcohol. 35 g. of dye which melts at 142° C., are obtained.

Coupler III slightly altered 15.1 g. of 2-aminobenzoic acid methyl ester (0.1 mol) are dissolved in 60 ml. of 5 N hydrochloric acid and quickly diazotized. The diazonium salt solution is then slowly added dropwise at 0° C. to a solution of 61.5 g. (0.1 mol) of the basic colorless color coupler, a basic color coupler of the structure of coupler III slightly altered and in accordance with the general formula set forth above, in 350 ml. of pyridine. The product is stirred for two hours and then precipitated with ice/hydrochloric acid. The dye is filtered under suction, washed with water, dried and recrystallized from alcohol. 57 g. of dye which melts at 104° C. were obtained.

Coupler IV 8.65 g. of sulfanilic acid (0.05 mol) are dissolved in 25 ml. of 2 N sodium hydroxide and the resulting solution is added dropwise with 10 ml. of 5 N sodium nitrite solution to 30 ml. of 5 N hydrochloric acid. The diazonium solution thus formed is then added dropwise to a solution of 25.85 g. (0.05 mol) of the basic colorless color coupler (cf. the formula of coupler IV) in 250 ml. of pyridine. The product is stirred for 2 hours and worked up as described in example 1. It is recrystallized from acetone. When dissolved in alcohol, the dye has an absorption maximum of 500 millimicrons.

Coupler VI 6.9 g. (0.05 mol) of o-nitraniline are diazotized in known manner and coupled with 30.8 g. (0.05 mol) of the basic colorless color coupler for coupler VI in 150 ml. of pyridine. The reaction mixture is stirred for 2 hours, poured over ice/hydrochloric acid and extracted with chloroform. After recyrstallization from methanol, 20 g. of dye which melts at 70° C., are obtained.

The colored couplers can be incorporated into the silver halide emulsions in a manner well known. If they are hydrophobic, they are added in the form of a dispersion in an aqueous solution of the binding agents, in particular gelatin. Generally the couplers of the present invention which melt below 120° C., are readily soluble in suitable organic solvents such as ethyl acetate which solution can easily be dispersed in aqueous gelatin. If necessary, however, it is possible to apply so-called oil formers. When the couplers are hydrophilic and contain acid groups, they may be added to the photographic emulsion in the form of their aqueous alkaline solutions.

The colored couplers of the present invention are superior to prior art couplers in many respects. For example, it is surprising that the electron-attracting effect of the substituents in the ortho position of the phenylazo-radical displaces the absorption maximum of the azo dye group into the longwave region. The new dyes are red to magenta in color, having an absorption maximum between 490 and 510 mu. This absorption range satisfies the requirement referred to above of correcting the side absorption of cyan image dyes lying more in the green than in the blue spectral region.

The colored cyan-forming couplers of the present invention can be used alone or in combination with uncolored cyan couplers to control the amount of correction produced. The relative proportion of the colored and uncolored coupler used in the mixture can be readily determined from spectral absorption curves or from densitometric curves. In general when the colored couplers are used in combination with conventional cyan couplers, they are applied in an amount of between 50 and 70 percent of the total amount of colored and uncolored couplers.

The developing agents used for development of exposed emulsion layers containing the couplers of the present invention include the primary aromatic amino silver halide developing agents, for example, of the p-phenylene diamine series including alkyl phenylene diamines and alkyl toluene diamines. The developing agents are characterized by an unsubstituted amino group which enables the oxidation products of the developer to react with the couplers to form the image dye.

The emulsions containing the colored couplers of the present invention can be chemically sensitized by any of the accepted procedures. They can also be optically sensitized according to common practice, for example, with cyanine or merocyanine dyes. The couplers described hereinbefore may be used in any kind of photographic emulsions, such as silver chloride or silver bromide emulsions or mixed silver halide emulsions which in addition may contain silver iodide.

EXAMPLE I 1 g. of colored color coupler I is dissolved in 12 ml. of ethyl acetate together with 3 g. of the colorless cyan coupler of the following formula:

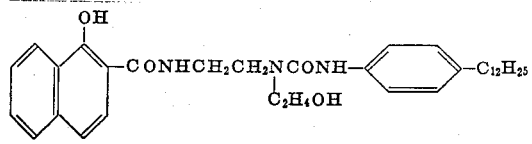

on which the colored coupler of formula I is based, and the resulting solution is dispersed with 64 ml. of 5 percent aqueous gelatin solution containing 2 ml. of 10 percent sodium dodecylbenzene sulfonate solution. The dispersion is added to a red-sensitive photographic silver bromide-iodide gelatin emulsion and the resulting mixture is applied onto a cellulose acetate support. A strip of the film so produced exposed behind a stepped wedge, is developed with a color developer containing 2-amino-5-diethylaminototulene as the developer substance.

A cyan dye with an absorption maximum of 698 millimicrons is obtained in the exposed areas, and a masking dye with an absorption maximum of 506 millimicrons is obtained at the unexposed areas.

EXAMPLE 2

1 g. of colored color coupler of the structure of coupler III slightly altered and in accordance with the general formula set forth above is dissolved in 3 ml. of ethyl acetate and dispersed with 16 ml. of 5 percent gelatin solution which, as in example 1, contains sodium dodecylbenzene-sulfonate solution. The dispersion is added to a red-sensitive silver bromide iodide gelatin emulsion and the resulting product is applied onto a support of polyethylene terephthalate.

The sample is exposed behind a grey test wedge which is further processed as described in example 1. An image dye with an absorption maximum of 692 millimicrons and a masking dye with an absorption maximum of 499 millimicrons are obtained.

Sensitometric curves show the outstanding masking effect obtained in respect of the side absorption of the cyan dye in both the green and the blue spectral regions.

The advantages of the couplers of the present invention are clearly demonstrated by comparison with a dye obtained by coupling diazotized o-aminobenzoic acid methyl ester with a color coupler known from the literature such as 1-oxy-2-N-octadecylnaphthamide. The masking effect of the comparison substance is not satisfactory.

A cyan image dye with an absorption maximum of 692 millimicrons and a masking dye with an absorption maximum of 500 millimicrons are obtained by using the colored color coupler of formula VI instead of the coupler of formula III under identical processing conditions.

We claim:

1. A photographic silver halide emulsion containing a colored cyan-forming coupler of the formula:

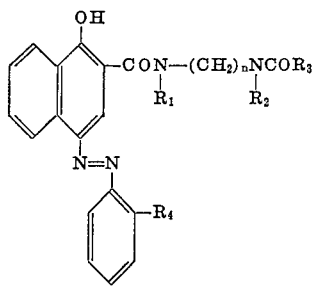

wherein
 $R_1$ represents an alkyl group or a radical of the phenyl series, or hydrogen;
 $R_2$ represents an alkyl group or a radical of the phenyl series;
 $R_3$ represents an alkyl-or aryl-substituted amino group;
 $R_4$ represents a carboxyl, esterified carboxyl or an acyl radical derived from an aliphatic carboxylic acid, sulfo or nitro;
 $n = 1$ 6. six.

2. The combination of claim 1 in which the colored cyan-forming coupler of the formula:

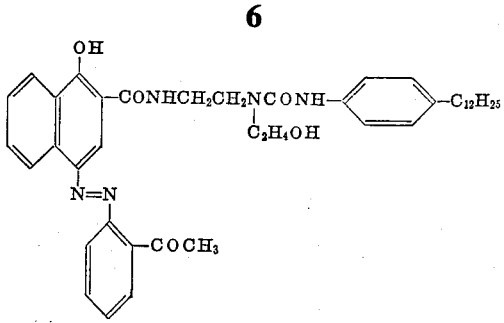

3. The combination of claim 1 in which the colored cyan-forming coupler of the formula:

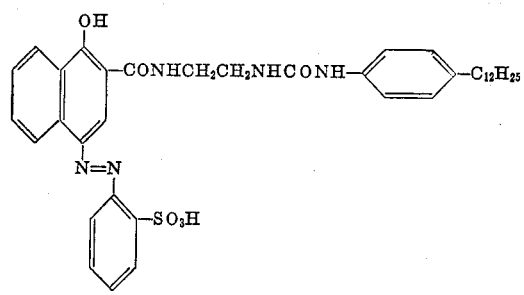

4. The combination of claim 1 in which the colored cyan-forming coupler of the formula:

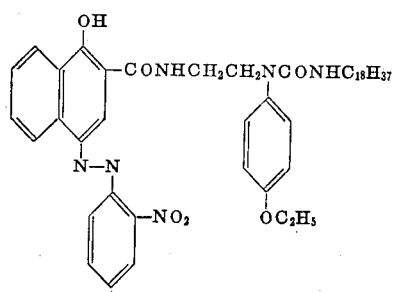

5. The combination of claim 1 in which the colored cyan-forming coupler has the formula:

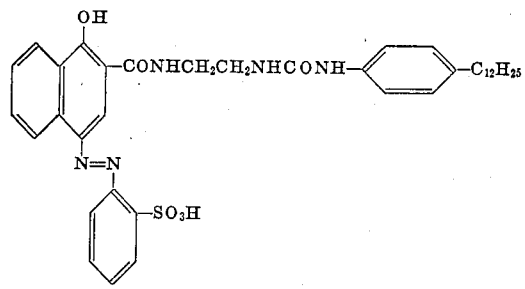

6. The combination of claim 1 in which the emulsion is a part of a multilayer color photographic material.

7. The combination of claim 1, wherein a colorless cyan-forming coupler is present in addition to the colored cyan-forming coupler.

* * * * *